US005774120A

United States Patent [19]
Goddard et al.

[11] Patent Number: 5,774,120
[45] Date of Patent: Jun. 30, 1998

[54] REFRESH AND SELECT-ALL ACTIONS IN GRAPHICAL USER INTERFACE

[75] Inventors: Joan Stagaman Goddard, Boulder, Colo.; Minh Trong Vo, Mountain View, Calif.

[73] Assignee: International Business Machines Corporation, Armonk, N.Y.

[21] Appl. No.: 696,751

[22] Filed: Aug. 14, 1996

[51] Int. Cl.$^6$ .................................................. G06F 3/00
[52] U.S. Cl. .......................................... 345/348; 345/356
[58] Field of Search .................................... 395/332, 340, 395/348, 346, 352, 353, 356, 680, 683, 682; 345/332, 340, 348, 353, 356

[56] References Cited

U.S. PATENT DOCUMENTS

| | | | |
|---|---|---|---|
| 4,464,652 | 8/1984 | Lapson et al. | 345/165 |
| 5,001,654 | 3/1991 | Winiger et al. | 707/529 |
| 5,062,060 | 10/1991 | Kolnick | 248/171 |
| 5,072,412 | 12/1991 | Henderson | 345/346 |
| 5,095,512 | 3/1992 | Roberts et al. | 382/245 |

(List continued on next page.)

FOREIGN PATENT DOCUMENTS

| | | | |
|---|---|---|---|
| 2097540 | 12/1994 | Canada | G06F 12/06 |
| 0 587 394 A1 | 3/1994 | European Pat. Off. | G09G 3/36 |
| 0 622 728 A1 | 11/1994 | European Pat. Off. | G06F 9/44 |
| 04-361373 | 12/1992 | Japan | G06F 15/60 |
| 05-313845 | 11/1993 | Japan | G06F 3/14 |
| 06-4117 | 1/1994 | Japan | G05B 19/403 |
| 06-215095 | 8/1994 | Japan | G06F 15/62 |
| 07-129597 | 5/1995 | Japan | G06F 17/30 |

OTHER PUBLICATIONS

"Device Independent Graphics Using Dynamic Generic Operator Selection," *IBM Technical Disclosure Bulletin*, Apr. 1983, vol. 25, No. 11A, pp. 5477–5480.

"Error–Tolerant Dynamic Allocation of Command Processing Work Space," *IBM Technical Disclosure Bulletin*, Jun. 1984, vol. 27, No. 1B, pp. 584–586.

"Means for Computing the Max of a Set of Variables Distributed Across Many Processors," *IBM Technical Disclosure Bulletin*, Sep. 1990, vol. 33, No. 4, pp. 8–12.

"Graphical User Interface for the Distributed System Namespace," *IBM Technical Disclosure Bulletin*, Jul. 1992, vol. 35, No. 2, pp. 335–336.

"Graphical Query System," *IBM Technical Disclosure Bulletin*, Nov. 1993, vol. 36, No. 11, pp. 615–616.

"Configuration Data Set Build Batch Program," *IBM Technical Disclosure Bulletin*, Nov. 1993, vol. 36, No. 11, p. 571.

Self–Contained Reusable Programmed Components, *IBM Technical Disclosure Bulletin* Jul. 1995, vol. 38, No. 7, pp. 283–285.

"IBM Printing Systems Manager for AIX Overview," *International Business Machines Corporation*, Second Edition, Feb. 1996.

"IBM Printing Systems Manager for AIX Administrating," *International Business Machines Corporation*, 1995.

"Matching Three–Dimensional Objects Using a Relational Paradigm," *Pattern Recognition*, vol. 17, No. 4, pp. 385–405, 1984.

"A Multicolumn List–Box Container for OS/2," *Dr. Dobb's Journal*, May 1994, vol. 19, No. 5, pp. 90–94.

*Primary Examiner*—Raymond J. Bayerl
*Assistant Examiner*—Cao H. Nguyen
*Attorney, Agent, or Firm*—Jenkens & Gilchrist

[57] ABSTRACT

The invention is carried out in the following environment. The computer system has at least a visual operator interface, an operating system for operating applications within the computer system, and memory for storing at least part, preferably all, of an application. An application apparatus, and method is provided for selecting all objects in a window or area. The Select All function also can be applied to wells. Also provided is an application, apparatus, and method for refreshing all objects in a window or area. The Refresh Function also can be applied to wells.

4 Claims, 4 Drawing Sheets

U.S. PATENT DOCUMENTS

| Patent # | Date | Inventor | Class |
|---|---|---|---|
| 5,117,372 | 5/1992 | Petty | 345/335 |
| 5,119,476 | 6/1992 | Texier | 345/347 |
| 5,121,477 | 6/1992 | Koopmans et al. | 345/333 |
| 5,140,677 | 8/1992 | Fleming et al. | 395/346 |
| 5,140,678 | 8/1992 | Torres | 345/350 |
| 5,163,130 | 11/1992 | Hullot | 395/335 |
| 5,164,911 | 11/1992 | Juran et al. | 364/578 |
| 5,206,950 | 4/1993 | Geary et al. | 395/702 |
| 5,208,907 | 5/1993 | Shelton et al. | 345/344 |
| 5,228,123 | 7/1993 | Heckel | 345/334 |
| 5,233,687 | 8/1993 | Henderson et al. | 345/346 |
| 5,247,651 | 9/1993 | Clarisse et al. | 395/500 |
| 5,249,265 | 9/1993 | Liang | 345/356 |
| 5,255,359 | 10/1993 | Ebbers et al. | 345/433 |
| 5,276,901 | 1/1994 | Howell et al. | 707/9 |
| 5,287,447 | 2/1994 | Miller et al. | 345/342 |
| 5,307,451 | 4/1994 | Clark | 345/427 |
| 5,315,703 | 5/1994 | Matheny et al. | 345/507 |
| 5,317,687 | 5/1994 | Torres | 345/349 |
| 5,317,730 | 5/1994 | Moore et al. | 707/100 |
| 5,367,619 | 11/1994 | Dipaolo et al. | 345/352 |
| 5,371,844 | 12/1994 | Andrew et al. | 345/334 |
| 5,377,317 | 12/1994 | Bates et al. | 345/342 |
| 5,388,255 | 2/1995 | Pytlik et al. | 707/4 |
| 5,394,521 | 2/1995 | Henderson et al. | 345/346 |
| 5,404,439 | 4/1995 | Moran et al. | 345/326 |
| 5,408,659 | 4/1995 | Cavendish et al. | 395/356 |
| 5,410,695 | 4/1995 | Frey et al. | 395/680 |
| 5,410,704 | 4/1995 | Norden-Paul et al. | 395/671 |
| 5,412,776 | 5/1995 | Bloomfield et al. | 345/346 |
| 5,414,806 | 5/1995 | Richards | 345/435 |
| 5,416,900 | 5/1995 | Blanchard et al. | 345/346 |
| 5,418,950 | 5/1995 | Li et al. | 707/4 |
| 5,428,554 | 6/1995 | Laskoski | 364/550 |
| 5,428,776 | 6/1995 | Rothfield | 707/4 |
| 5,438,659 | 8/1995 | Notess et al. | 345/335 |
| 5,450,545 | 9/1995 | Martin et al. | 395/701 |
| 5,454,071 | 9/1995 | Siverbrook et al. | 345/441 |
| 5,454,106 | 9/1995 | Burns et al. | 707/4 |
| 5,459,825 | 10/1995 | Anderson et al. | 345/433 |
| 5,459,832 | 10/1995 | Wolf et al. | 395/356 |
| 5,461,710 | 10/1995 | Bloomfield et al. | 395/346 |
| 5,463,724 | 10/1995 | Anderson et al. | 707/503 |
| 5,473,745 | 12/1995 | Berry et al. | 345/340 |
| 5,479,599 | 12/1995 | Rockwell et al. | 345/349 |
| 5,481,666 | 1/1996 | Nguyen et al. | 345/357 |
| 5,483,651 | 1/1996 | Adams et al. | 707/1 |
| 5,487,141 | 1/1996 | Cain et al. | 345/435 |
| 5,491,795 | 2/1996 | Beaudet et al. | 345/346 |
| 5,497,454 | 3/1996 | Bates et al. | 345/344 |
| 5,497,484 | 3/1996 | Potter et al. | 707/200 |
| 5,638,505 | 6/1997 | Hemenway et al. | 395/348 |

REFRESH AND SELECT-ALL ACTIONS IN GRAPHICAL USER INTERFACE

BACKGROUND OF THE INVENTION AND STATE OF THE PRIOR ART

1. Field of the Invention

The present invention relates to graphical user interfaces. More particularly, the invention relates to a method, apparatus and application for refreshing or selecting all objects in a window of a graphical user interface. The invention applies, at the user's option, to wells related to objects in the initial window.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only to allow the user to communicate with the computer but also allow the computer to communicate with the user. These would include (1) command-line user interfaces (i.e., user remembered commands which he/she enters, e.g. "C:>Dir" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With object oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, and a sharp pencil, while an accountant's objects might include a ledger and a calculator.) However, it is not required that an object always be represented by an icon, and not all interaction is accomplished by way of icons.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object

This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER—ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS", and "PORTRAITS". In turn, selecting any of those three icons may open additional windows with further icons representing further subdivisions, or cross-references (e.g., "CUSTOMERS").

(2) Data Objects

The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects

The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and class of objects, typically each class of objects will include similar attributes, the values of which the user will alter, modify, replace or remove from time to time. For a more complete discussion of objects, attributes, object oriented interfaces etc. see "Object Oriented Interface Design: IBM Common User Access" (published by Que, ISBN 1-56529-170-0).

In a graphical user interface, a user frequently desires to select all the objects in a particular window or area. In addition, users frequently desire to refresh the contents of a particular window or area such that the status of icons in the window or area is updated. The method by which these desires can be accomplished is not convenient for the user in the products presently available.

For example, in IBM's Visual System Management ("VSM") application, there is a Select All item on the pop-up menu for areas and "windows within windows", which are also called "wells." The Select All item is not available as an icon in VSM. Moreover, there is no Refresh function in VSM.

The problem of a select all function and a refresh function becomes even more complex if there are many wells, i.e., windows of objects that are related to objects in an initial window.

SUMMARY OF THE INVENTION

It is an object of the present invention to provide a graphical means for selecting all objects in a window or area.

It is a further object of the present invention to provide a graphical means for refreshing all objects in a window or area.

Additionally, it is an object of the present invention to provide a graphical means for selecting all objects or refreshing all objects even for windows within windows otherwise known as wells.

Still another object of the present invention is to provide an application which may be employed in a number of different computers, may be transported between different computers, and may be loaded into various computer environments.

The invention is carried out in the following environment. The computer system has at least a visual operator interface, an operating system for operating applications within the computer system, and memory for storing at least part, preferably all, of an application. An application apparatus, and method is provided for selecting all objects in a window or area. The Select All function also can be applied to wells. Also provided is an application, apparatus, and method for refreshing all objects in a window or area. The Refresh Function also can be applied to wells.

Other objects of the invention and a more complete understanding of the invention may be had by referring to the following description taken in conjunction with the accompanying drawings.

BRIEF DESCRIPTION OF THE DRAWING(S)

DESCRIPTION OF THE ILLUSTRATIVE EMBODIMENT(S)

Figure 1:
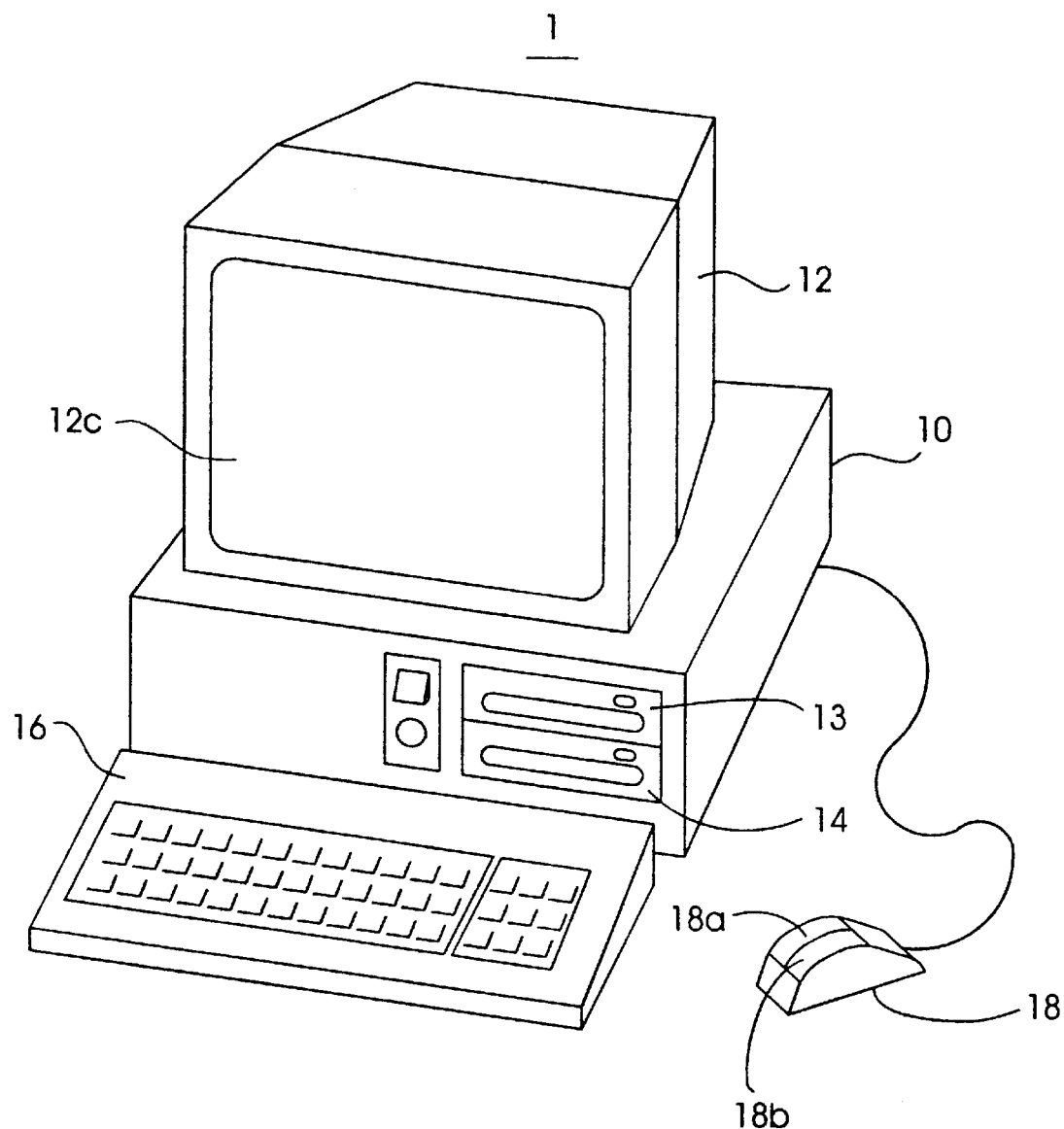
FIG. 1 illustrates a typical desktop computer system which may be employed to practice the novel method and application of the present invention.
Figure 2:
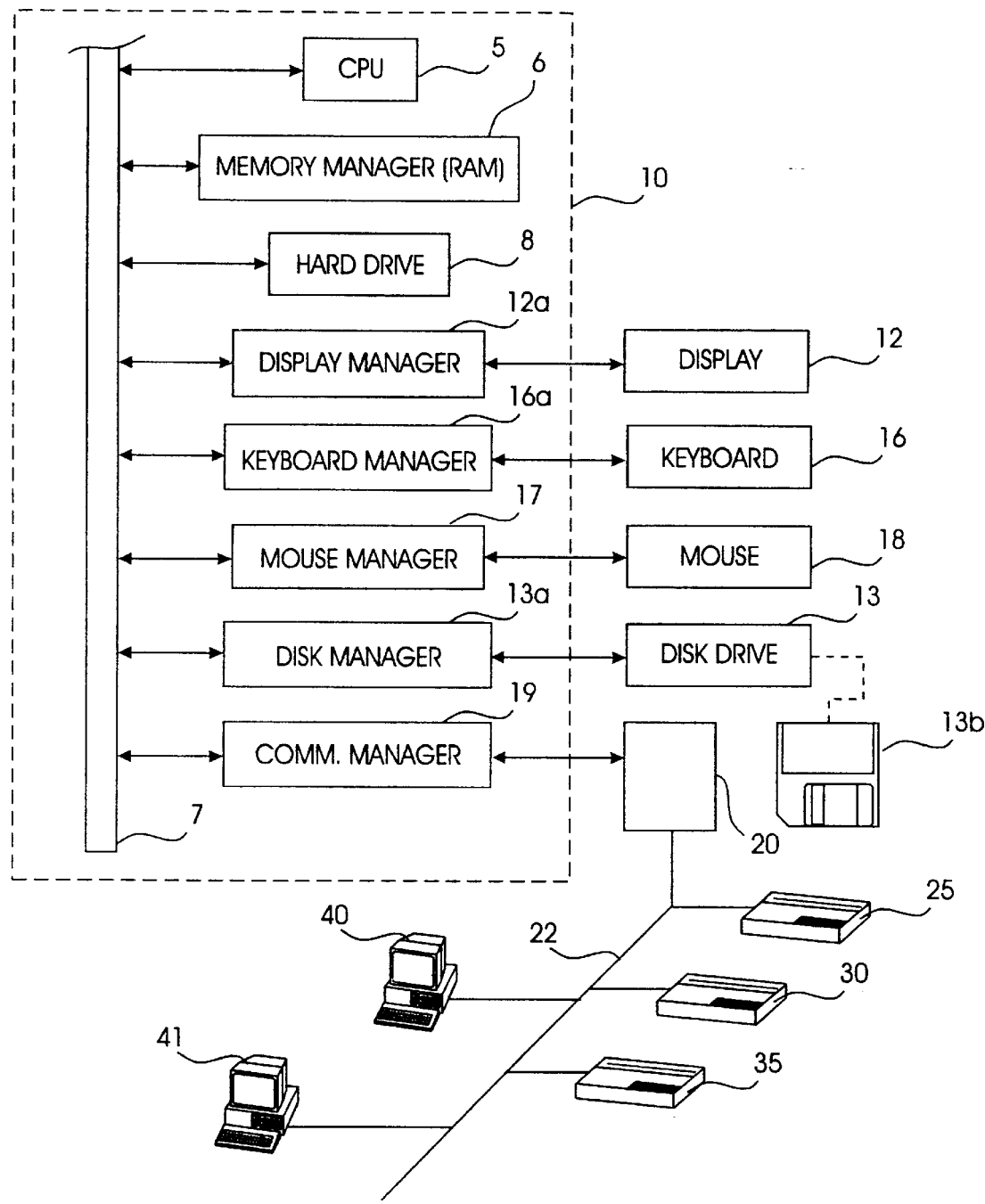
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system, usually through a software mouse driver provided by the mouse manufacturer. With the first mouse button (MB) 18a the operator can select an element indicated on the display screen 12c using the pointer or cursor 12b, i.e., signify that an action subsequently to be performed is to be carried out on the data represented by the indicated element on the display screen 12c. The system normally gives some visual feedback to the operator to indicate the element selected, such as a change in color, or a blocking of the icon. The second mouse button (MB) 18b may be a menu button, if desired. Conventionally, when the operator presses button 18b, a selection menu or dialog with system commands will appear on the display screen 12c. The operator may select an icon or item from the selection menu or input information into the dialog box as appropriate using the cursor 12b and the first mouse button (MB) 18a. Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and software drivers therefore) within the chassis 10 communicate with one another via a bus 7. To round out the computer system 1, an operating system (not shown) must be employed. If the computer system is a typical IBM-based system, the operating system may be DOS-based and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like. However the method and application of the present invention works equally well with multiple objects serviced by a single computer system.

Figure 3:
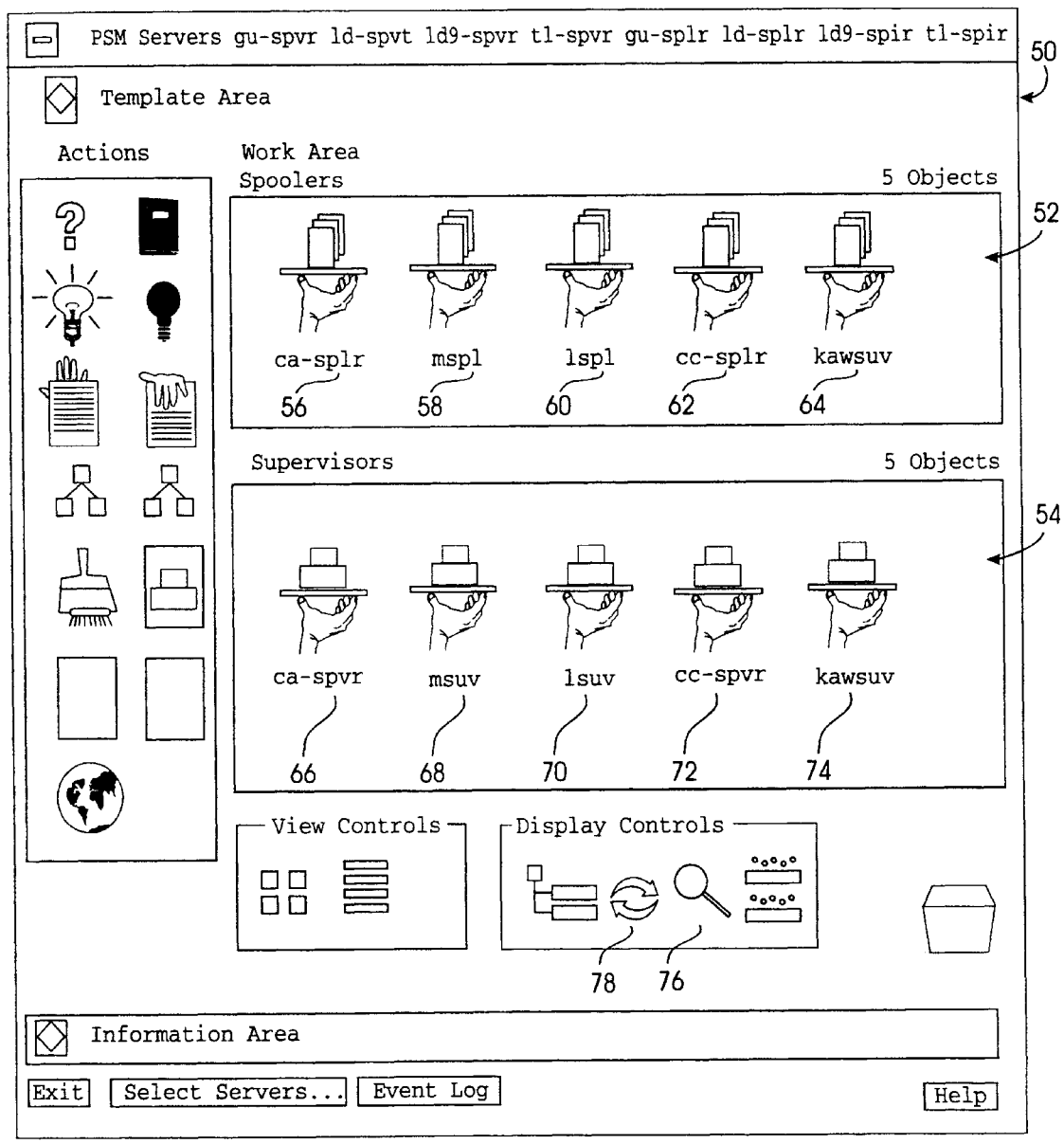
FIG. 3 is a typical window, in accordance with the present invention, showing a refresh function icon.

FIG. 3 shows a window 50 in accordance with the present invention. Window 50 contains panes, 52 and 54. Pane 52 contains five icons, 56, 58, 60, 62 and 64. Pane 54 also contains five icons, 66, 68, 70, 72 and 74. At the bottom of window 50 is the Display Controls area 76. The Refresh icon 78 is an icon within the Display Controls area 76. The Refresh icon can be selected by the user and dragged and dropped onto either (1) icons 56–64 in pane 52, (2) icons 66–74 in pane 54, (3) a well within a pane or area (not shown), (4) pane 52 or pane 54, or (5) an area, such as Work Area 80. The result of each dropping action is described in the boxes below.

| Target | Result |
| --- | --- |
| | Refresh Function |
| Object Icon | Refresh icon status for object and refresh content of any wells opened from object |
| Well | Refresh content of well |
| Pane | Refresh content of pane but not contents of wells in pane |
| Area | Refresh content of area but not content of wells in area |
| | Select All Function |
| Object Icon | Select object |
| Well | Select all objects in well |
| Pane | Select all objects in pane but not in wells in pane |
| Area | Select all objects in area but not in wells in area |

Figure 4:
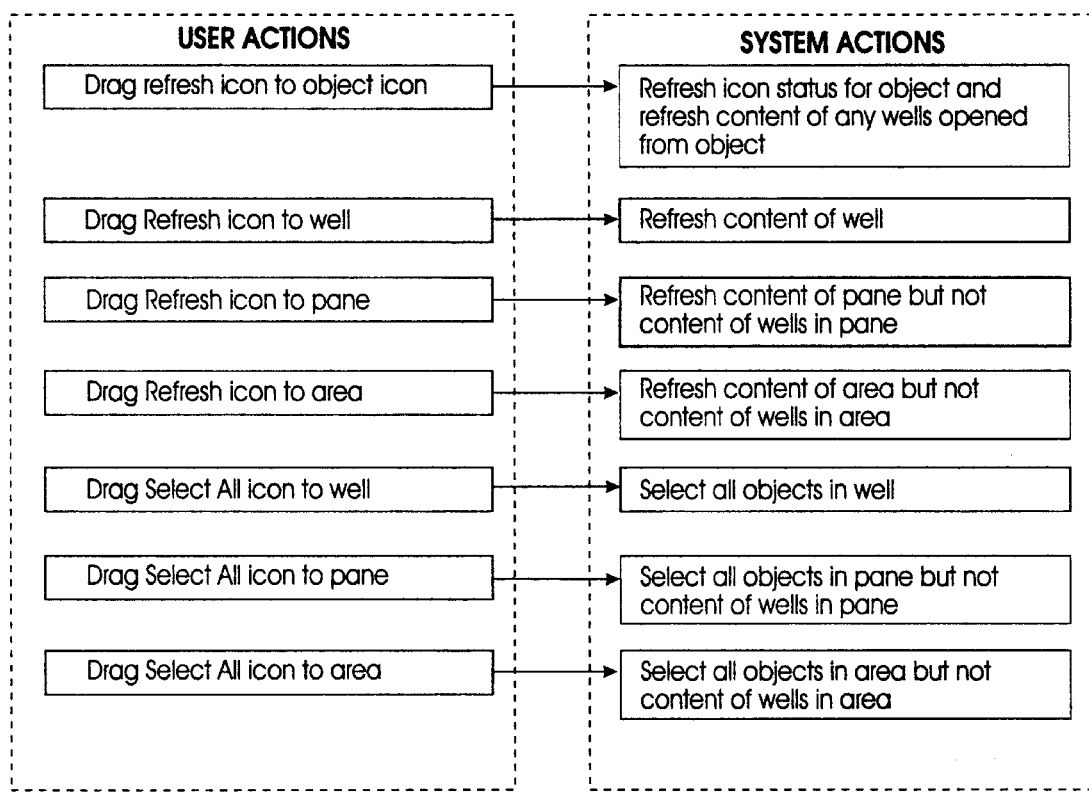
FIG. 4 is a flow chart illustrating the method of the present invention.

FIG. 4 is a flow chart showing the method of the present invention.

The presentation thus provides an easy and convenient mechanism by which a user may select all the objects in a given pane or area. The user can decide whether to also select all objects in associated wells or not.

The present invention also provides a means to refresh the objects in a given pane or area. As an example, the user can use the Refresh function to update the status of printer queues or to update the status of available printers. The Refresh function can be used for the entire pane or area, with or without associated wells, at the user's option.

Although the invention has been described with a certain degree of particularity, it should be recognized that elements thereof may be altered by person(s) skilled in the art without departing from the spirit and scope of the invention. The invention is limited only by the following claims and their equivalents.

What is claimed is:

1. An application for selecting all objects in a user-selected target as controlled by a computer system having at least a visual operator interface, an operating system for controlling the operation of program applications within the computer system, and memory for storing a program application, the application comprising:

a Select All function;

means for selecting the Select All function;

means for dragging and dropping the Select All function on a user-selected target;

if the selected target is one object, means for selecting the object;

if the selected target is a well, means for selecting all objects in the well;

if the selected target is a pane, means for selecting all objects in the pane but not selecting objects in wells associated with the pane; and if the selected target is an area, means for selecting all objects in the area, but not selecting objects in wells associated with the area.

2. An application for refreshing the icon status of all objects in a user-selected target as controlled by a computer system having at least a visual operator interface, an operating system for controlling the operation of applications within the computer system, and memory means for storing an application, the application comprising:

a Refresh function;

means for selecting the Refresh function;

means for dragging and dropping the Refresh function on a user-selected target;

if the selected target is one object, means for refreshing the object and any wells opened from the object;

if the selected target is a well, means for refreshing all objects in the well;

if the selected target is a pane, means for refreshing all objects in the pane, but not refreshing objects in wells associated with the pane; and if the selected target is an area, means for refreshing all objects in the area, but not refreshing objects in wells associated with the area.

3. A method for selecting all objects in a user-selected target as controlled by a computer system having at least a visual operator interface, an operating system for controlling the operation of applications within the computer system, and memory for storing at least part of an application, the method comprising the steps of:

selecting a Select All function;

dragging and dropping the Select All function on a user-selected target;

if the selected target is one object, selecting the object;

if the selected target is a well, selecting all objects in the well;

if the selected target is a pane, selecting all objects in the pane but not selecting objects in wells associated with the pane; and if the selected target is an area, selecting all objects in the area, but not selecting objects in wells associated with the area.

4. A method for refreshing the icon status of all objects in a user-selected target as controlled by a computer system having at least a visual operator interface, an operating system for controlling the operation of applications within the computer system, and memory means for storing an application, the method comprising the steps of:

selecting a Refresh function;

dragging and dropping the Refresh function on a user-selected target;

if the selected object is one object, refreshing the object and any wells opened from the object;

if the selected target is a well, refreshing all objects in the well;

if the selected target is a pane, refreshing all objects in the pane, but not refreshing objects in wells associated with the pane; and if the selected target is an area, refreshing all objects in the area, but not refreshing objects in wells associated with the area.

* * * * *